US012520082B2

(12) United States Patent
Lehtiniemi et al.

(10) Patent No.: US 12,520,082 B2
(45) Date of Patent: Jan. 6, 2026

(54) OUTPUT OF STEREO OR SPATIAL AUDIO

(71) Applicant: Nokia Technologies Oy, Espoo (FI)

(72) Inventors: Arto Juhani Lehtiniemi, Tampere (FI); Jussi Artturi Leppänen, Tampere (FI); Miikka Tapani Vilermo, Tampere (FI)

(73) Assignee: Nokia Technologies Oy, Espoo (FI)

( * ) Notice: Subject to any disclaimer, the term of this patent is extended or adjusted under 35 U.S.C. 154(b) by 337 days.

(21) Appl. No.: 18/487,199

(22) Filed: Oct. 16, 2023

(65) Prior Publication Data

US 2024/0155293 A1 May 9, 2024

(51) Int. Cl.

| | |
|---|---|
| ***H04R 5/04*** | (2006.01) |
| ***G06F 3/16*** | (2006.01) |
| ***G10L 19/008*** | (2013.01) |
| ***H04R 5/02*** | (2006.01) |
| ***H04S 3/00*** | (2006.01) |
| ***H04S 7/00*** | (2006.01) |

(52) U.S. Cl.

CPC ............... *H04R 5/04* (2013.01); *G06F 3/165* (2013.01); *G10L 19/008* (2013.01); *H04R 5/02* (2013.01); *H04S 3/008* (2013.01); *H04S 7/302* (2013.01); *H04S 2400/01* (2013.01); *H04S 2400/11* (2013.01); *H04S 2400/13* (2013.01)

(58) Field of Classification Search

CPC ... H04R 5/04; H04R 1/02; H04R 1/24; H04R 5/02; H04R 2205/022; H04R 2420/03; H04R 2430/01; H04R 2499/11; G06F 3/165; G10L 19/008; H04S 3/008; H04S 7/302; H04S 7/303; H04S 2400/01; H04S 2400/07; H04S 2400/11; H04S 2400/13

USPC .......................................................... 381/303

See application file for complete search history.

(56) References Cited

U.S. PATENT DOCUMENTS

| | | | | |
|---|---|---|---|---|
| 2007/0110265 A1 | 5/2007 | Kirkeby et al. | | |
| 2013/0129122 A1 | 5/2013 | Johnson et al. | | |
| 2013/0163794 A1* | 6/2013 | Groves | G06F 1/1626 | 381/303 |

(Continued)

FOREIGN PATENT DOCUMENTS

| | | |
|---|---|---|
| EP | 2775693 A2 | 9/2014 |
| EP | 3487188 A1 | 5/2019 |
| GB | 2508364 A | 6/2014 |

OTHER PUBLICATIONS

Office action received for corresponding European Patent Application No. 22205970.1, dated Sep. 12, 2025, 8 pages.

(Continued)

*Primary Examiner* — Paul Kim

(74) *Attorney, Agent, or Firm* — Nokia Technologies Oy

(57) ABSTRACT

Example embodiments relate to an apparatus, method and computer program for output of stereo or spatial audio. The method may for example comprise providing first data representing stereo or spatial audio, providing second data representing other audio and determining an orientation and/or configuration of an apparatus. The method may also comprise outputting the first data to selected first and second loudspeakers of the apparatus, comprising at least three loudspeakers based, at least in part, on the orientation and/or configuration of the apparatus; and outputting the second data to at least a third loudspeaker of the at least three loudspeakers other than the first and second loudspeakers.

20 Claims, 8 Drawing Sheets

(56) References Cited

U.S. PATENT DOCUMENTS

| | | | |
|---|---|---|---|
| 2014/0233771 | A1 | 8/2014 | Giustina et al. |
| 2018/0027329 | A1 | 1/2018 | Jeon et al. |
| 2019/0104373 | A1 | 4/2019 | Wodrich et al. |

OTHER PUBLICATIONS

Partial European Search Report received for corresponding European Patent Application No. 22205970.1, dated Apr. 26, 2023, 15 pages.

Extended European Search Report received for corresponding European Patent Application No. 22205970.1, dated Jul. 27, 2023, 15 pages.

* cited by examiner

OUTPUT OF STEREO OR SPATIAL AUDIO

RELATED APPLICATION

This application claims priority to European Patent Application No. 22205970.1, filed Nov. 8, 2022, which is incorporated herein by reference in its entirety.

TECHNICAL FIELD

Example embodiments relate to an apparatus, method and computer program for output of stereo or spatial audio.

BACKGROUND

User devices such as tablet computers and smartphones may have different form factors. For example, some smartphones have multiple screens, some have greater than two loudspeakers and/or some may be foldable. Some user devices may be used in different orientations, e.g. changing a user interface from a portrait mode to a landscape mode upon detecting rotation of the user device. User devices may be configured to receive and decode different types of audio data, including monaural audio data, stereoscopic (stereo) audio data comprising two channels, other forms of multi-channel audio data, e.g. 2.1, 5.1 and 7.1 and spatial audio data in which a spatial percept is encoded for greater immersion within the created sound field.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, this specification describes an apparatus, comprising: at least three loudspeakers spaced apart at respective locations on the apparatus; means for providing first data representing stereo or spatial audio; means for providing second data representing other audio; means for determining an orientation and/or configuration of the apparatus; means for controlling audio output, by: outputting the first data to selected first and second loudspeakers of the at least three loudspeakers based, at least in part, on the orientation and/or configuration of the apparatus; and outputting the second data to at least a third loudspeaker of the at least three loudspeakers other than the first and second loudspeakers.

The outputting may be responsive, at least in part, to the first data representing stereo or spatial audio.

The outputting may be responsive, at least in part, to the first data being received from one or more predetermined applications on the apparatus.

The outputting may be responsive, at least in part, to an above-threshold volume input or effects input associated with the first data. For example, the effects input may relate to stereo widening and/or one or more low frequency effects.

Based on the orientation and/or configuration of the apparatus, the selected first and second loudspeakers may be respectively associated with left and right-hand sides of the apparatus. The third loudspeaker may be at a location in-between the selected first and second loudspeakers.

The apparatus may comprise a foldable body movable between open and closed orientations, wherein: in the open orientation, the selected first and second loudspeakers may be respectively associated with left and right-hand sides of the apparatus and the third loudspeaker may be at a location in-between the first and second loudspeakers; and in the closed orientation, the first and second loudspeakers may be associated with the same side of the apparatus, and the control means may be configured to select the third loudspeaker in place of the first loudspeaker so that the first data is output by the second and third loudspeakers and the second data is output by the first loudspeaker.

The second data may represent monaural audio.

The first and second data may represent respective parts of an audio scene, the first data representing stereo or spatial audio associated with one or more ambient sounds of the audio scene and the second data representing monaural audio associated with one or more objects of the audio scene. The first and second data may be encoded in a data file or stream using the metadata-assisted spatial audio, MASA, format.

The second data may represent low-frequency audio components associated with the first data.

The second data may represent one or more of: system sounds generated by an operating system or an application of the apparatus; and audio from a call, conference or voice message.

The system sounds may correspond to notifications issued by the operating system or an application of the apparatus in response to one or more events.

The first data may be associated with a first application having a first user interface which can transition from an enlarged display mode to a picture-in-picture display mode in which the first user interface overlays at least a second user interface associated with a second application, wherein: responsive to the first user interface transitioning from the enlarged display mode to the picture-in-picture display mode, the control means may be further configured to switch audio data from the second application to the first and second loudspeakers for stereo output, and the first data from the first application to the third loudspeaker.

The control means may be configured to switch the audio data responsive to one or more of: audio data from the second application representing stereo or spatial audio, first preference data indicating that the second application has priority over the first application when the first application is in the picture-in-picture mode; and second preference data indicating that the second application has priority over the first application based on a current orientation and/or configuration of the apparatus.

According to a second aspect, this specification describes a method, comprising: providing first data representing stereo or spatial audio; providing second data representing other audio; determining an orientation and/or configuration of an apparatus; outputting the first data to selected first and second loudspeakers of the apparatus comprising at least three loudspeakers based, at least in part, on the orientation and/or configuration of the apparatus; and outputting the second data to at least a third loudspeaker of the at least three loudspeakers other than the first and second loudspeakers.

The outputting may be responsive, at least in part, to the first data representing stereo or spatial audio.

The outputting may be responsive, at least in part, to the first data being received from one or more predetermined applications on the apparatus.

The outputting may be responsive, at least in part, to an above-threshold volume input or effects input associated with the first data. For example, the effects input may relate to stereo widening and/or one or more low frequency effects.

Based on the orientation and/or configuration of the apparatus, the selected first and second loudspeakers may be respectively associated with left and right-hand sides of the apparatus. The third loudspeaker may be at a location in-between the selected first and second loudspeakers.

The apparatus may comprise a foldable body movable between open and closed orientations. In the open orientation, the selected first and second loudspeakers may be respectively associated with left and right-hand sides of the apparatus and the third loudspeaker may be at a location in-between the first and second loudspeakers. In the closed orientation, the first and second loudspeakers may be associated with the same side of the apparatus, and the outputting may select the third loudspeaker in place of the first loudspeaker so that the first data is output by the second and third loudspeakers and the second data is output by the first loudspeaker.

The second data may represent monaural audio.

The first and second data may represent respective parts of an audio scene, the first data representing stereo or spatial audio associated with one or more ambient sounds of the audio scene and the second data representing monaural audio associated with one or more objects of the audio scene. The first and second data may be encoded in a data file or stream using the metadata-assisted spatial audio, MASA, format.

The second data may represent low-frequency audio components associated with the first data.

The second data may represent one or more of: system sounds generated by an operating system or an application of the apparatus; and audio from a call, conference or voice message.

The system sounds may correspond to notifications issued by the operating system or an application of the apparatus in response to one or more events.

The first data may be associated with a first application having a first user interface which can transition from an enlarged display mode to a picture-in-picture display mode in which the first user interface overlays at least a second user interface associated with a second application, wherein: responsive to the first user interface transitioning from the enlarged display mode to the picture-in-picture display mode, the outputting may further comprise switching the audio data from the second application to the first and second loudspeakers for stereo output, and the first data from the first application to the third loudspeaker.

The outputting may comprise switching the audio data responsive to one or more of: audio data from the second application representing stereo or spatial audio, first preference data indicating that the second application has priority over the first application when the first application is in the picture-in-picture mode; and second preference data indicating that the second application has priority over the first application based on a current orientation and/or configuration of the apparatus.

According to a third aspect, this specification describes a computer program comprising instructions for causing an apparatus to perform at least the following: providing first data representing stereo or spatial audio; providing second data representing other audio; determining an orientation and/or configuration of an apparatus; outputting the first data to selected first and second loudspeakers of the apparatus comprising at least three loudspeakers based, at least in part, on the orientation and/or configuration of the apparatus; and outputting the second data to at least a third loudspeaker of the at least three loudspeakers other than the first and second loudspeakers.

The third aspect may also comprise any feature of the second aspect.

According to a fourth aspect, this specification describes a computer-readable medium (such as a non-transitory computer-readable medium) comprising program instructions stored thereon for performing at least the following: providing first data representing stereo or spatial audio; providing second data representing other audio; determining an orientation and/or configuration of an apparatus; outputting the first data to selected first and second loudspeakers of the apparatus comprising at least three loudspeakers based, at least in part, on the orientation and/or configuration of the apparatus; and outputting the second data to at least a third loudspeaker of the at least three loudspeakers other than the first and second loudspeakers.

The fourth aspect may also comprise any feature of the second aspect.

According to a fifth aspect, this specification describes an apparatus comprising: at least one processor; and at least one memory including computer program code which, when executed by the at least one processor, causes the apparatus to: provide first data representing stereo or spatial audio; provide second data representing other audio; determine an orientation and/or configuration of an apparatus; output the first data to selected first and second loudspeakers of the apparatus comprising at least three loudspeakers based, at least in part, on the orientation and/or configuration of the apparatus; and output the second data to at least a third loudspeaker of the at least three loudspeakers other than the first and second loudspeakers.

The fifth aspect may also comprise any feature of the second aspect.

BRIEF DESCRIPTION OF DRAWINGS

Example embodiments will now be described, by way of non-limiting example, with reference to the accompanying drawings, in which.

DETAILED DESCRIPTION

Figure 1B:
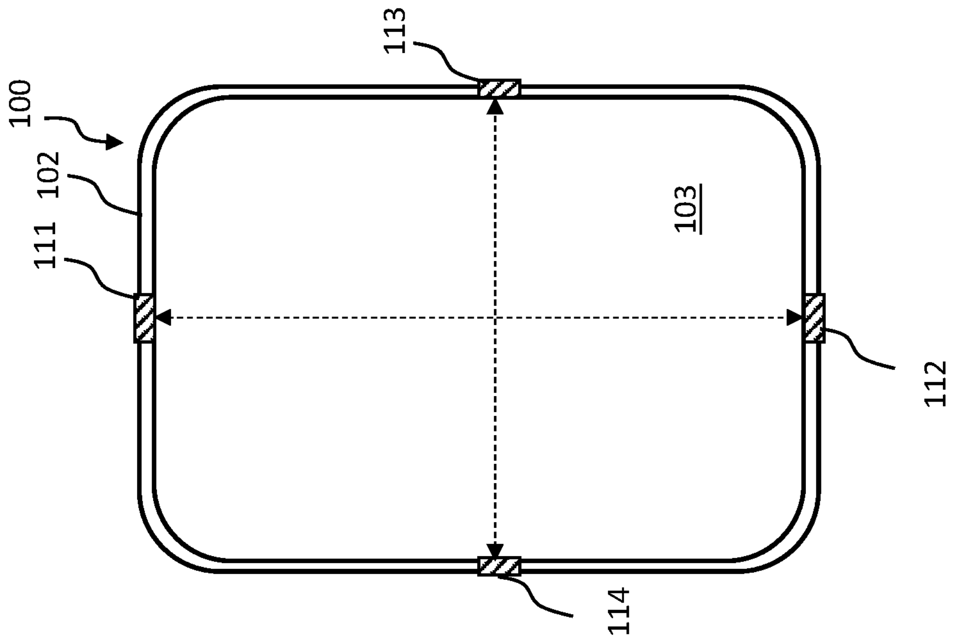
FIG. 1B is a plan view of the FIG. 1A first apparatus in a second orientation.

Example embodiments relate to an apparatus, method and computer program for output of stereo or spatial audio. Stereo or spatial audio may be represented by data in any suitable form, whether in the form of one or more data files or, in the case of streaming data, data packets or any other suitable format.

In its basic form, stereo audio data comprises two channels, left and right, for output by respective first and second loudspeakers. More advanced formats include 2.1, which adds lower frequencies for output to a third, subwoofer loudspeaker, as well as 5.1 and 7.1 which may be generally known as "surround sound" formats. Spatial audio data, also called three dimensional audio or immersive audio, may describe audio data that enables users to perceive sounds from all around them; for a fully-immersive experience, the spatial audio data may include cues so that users can perceive other properties such as directions of sounds emitted by one or more sound objects, trajectories of the sound objects, variations of sound magnitudes based on changing distance from the sound objects, and other sound effects. For example, if a user moves their user device, e.g. their smartphone, this may change how the audio is perceived.

As used herein, the apparatus may comprise a user device having three or more loudspeakers. The user device may be a portable user device, for example a smartphone, a tablet computer, digital assistant, wearable computer or head mounted device (HMD). This list is not exhaustive.

User devices may have different form factors. For example, some user devices have multiple screens, some have three or more loudspeakers and/or some may be foldable, i.e. having a foldable body carrying a foldable screen for use in both open and closed configurations and possibly in one or more intermediate configurations in which the screen is at some angle between the open and closed configurations. Some user devices may be used in different orientations, e.g. changing a user interface from a portrait mode to a landscape mode upon detecting rotation of the user device beyond 45 degrees of the horizontal plane or thereabouts. User devices may be configured to receive and decode different types of audio data, including monaural audio data, stereoscopic (stereo) audio data comprising two channels, other forms of multi-channel audio data, e.g. 2.1, 5.1 and 7.1 and spatial audio data.

User devices may be capable of establishing a communications session with one or more other user devices, servers and/or nodes via a communications network. A user device may be configured to transmit and receive data using protocols for 3G, 4G, LTE, 5G or any future generation communication protocol. A user device may comprise means for short-range communications using, for example, Bluetooth, Zigbee or WiFi. The user device may comprise one or more antennas for communicating with external devices, for example one or more other remote user devices and/or one or more remote servers and/or one or more communications nodes of a network.

In use, a user device may process and output different types of audio data. For example, a user device may output stereo audio data associated with a music track or movie to first and second loudspeakers. Upon receipt of other audio data, i.e. audio data not being the stereo audio data currently being output to the first and second loudspeakers, this is usually output by one or both of the first and second loudspeakers. For example, upon receipt of a new text or multimedia message, an audible notification may be output to one or both of the first and second loudspeakers. The two types of audio data are mixed, at least for some period of time. The same or similar situation may be true for other types of data such as incoming call or conference notifications. Indeed, sometimes output of the other audio data may pause, mute or reduce the volume of the stereo audio data, at least for some period of time. Example embodiments are aimed at improved flexibility and user experience for user devices where there are three or more loudspeakers. For example, example embodiments may enable utilization of one or more loudspeakers that are currently not in use. For example, example embodiments may enable optimized audio output, e.g. stereo widening effects, enhanced immersivity and/or increased volume, by not mixing this other audio data with the stereo audio data. Other advantages will become apparent.

FIGS. 1 and 2 show example user devices to which example embodiments may be applied.

Figure 1A:
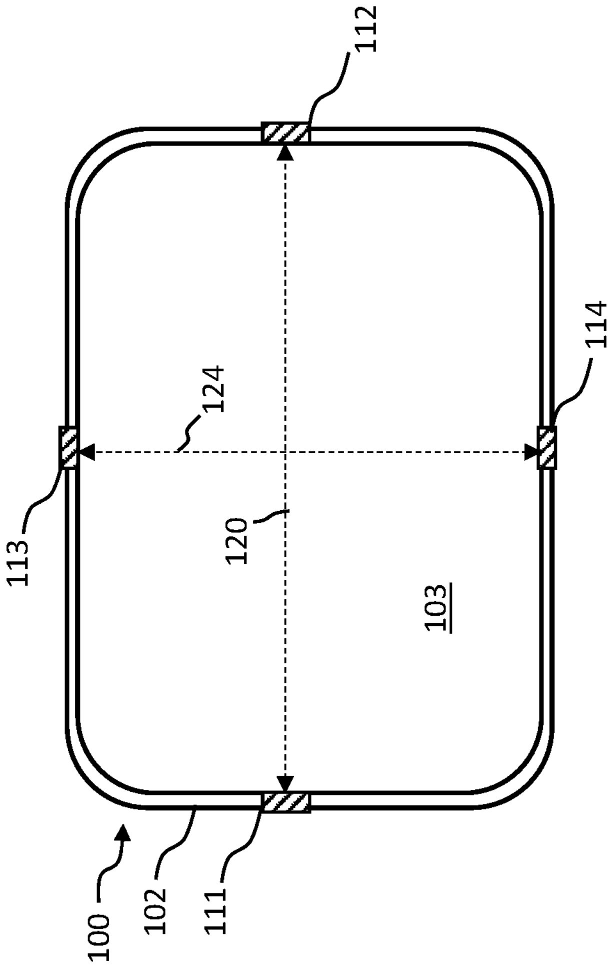
FIG. 1A is a plan view of a first apparatus in a first orientation to which one or more example embodiments may be applied.

Referring to FIG. 1A, an example user device is shown in the form of a tablet computer ("tablet") 100.

The tablet 100 may comprise an outer peripheral casing 102 and, on a front side, a touch-sensitive display (hereafter "display") 103. The tablet 100 may comprise front and/or rear-facing cameras (not shown) as well as one or more microphones (not shown). The tablet 100 may also comprise at least three loudspeakers, in this case first to fourth loudspeakers 111-114. First and second loudspeakers 111, 112 are shown located on the left and right-hand sides of the tablet 100 respectively. What constitutes the left and right-hand sides of the tablet 100 may be based on the current orientation of the tablet. This may be determined by one or more controllers and/or processors of the tablet 100 based on, for example, determining the direction of gravity with respect to the tablet using one or more sensor(s) such as accelerometer(s). The first and second loudspeakers 111, 112 are spaced apart in a first direction 120 along a horizontal plane and are generally aligned along the vertical plane, although this is not strictly necessary (one may be higher than the other). Third and fourth loudspeakers 113, 114 are shown located on the top and bottom sides of the tablet 100 respectively. The third and fourth loudspeakers 113, 114 are spaced apart in a second direction 124 along the vertical plane and are generally aligned along the horizontal plane, although this is not strictly necessary (one may be more to the left or right-hand side than the other).

For the avoidance of doubt, the respective locations of the first to fourth loudspeakers 111-114 need not be at the extreme edges of the tablet computer; they may be located inwardly of said edges. The first to fourth loudspeakers 111-114 may be mounted on the front side of the tablet 100, generally perpendicular to the display 103, or they may be mounted at other positions such as on the edges of the outer peripheral casing 102, generally parallel with the display. Alternatively still, the first to fourth loudspeakers 111-114 may be mounted on a rear side of the tablet 100, generally perpendicular to the display 103. Alternatively still, some of the first to fourth loudspeakers 111-114 may be mounted on the front side or edges of the tablet 100 and others may be mounted on the rear side of the tablet. For example, the first and second loudspeakers 111, 112 may be mounted on the front side of the tablet 100 and the third and fourth loudspeakers 113, 114 may be mounted on the rear side of the tablet.

The tablet 100 is shown in FIG. 1A in a first orientation, or what is generally known as a landscape orientation. In use, a user may rotate the tablet 100 to a different orientation.

FIG. 1B shows the tablet 100 in a second orientation, or what is generally known as a portrait orientation. It will be seen that the first and second loudspeakers 111, 112 are now on the top and bottom sides of the tablet 100, respectively, and the third and fourth loudspeakers 113, 114 are now on the (updated) right and left-hand sides of the tablet due to the change of orientation.

As will become clear, example embodiments involve selecting which speakers to use for different types of audio data.

Figure 2B:
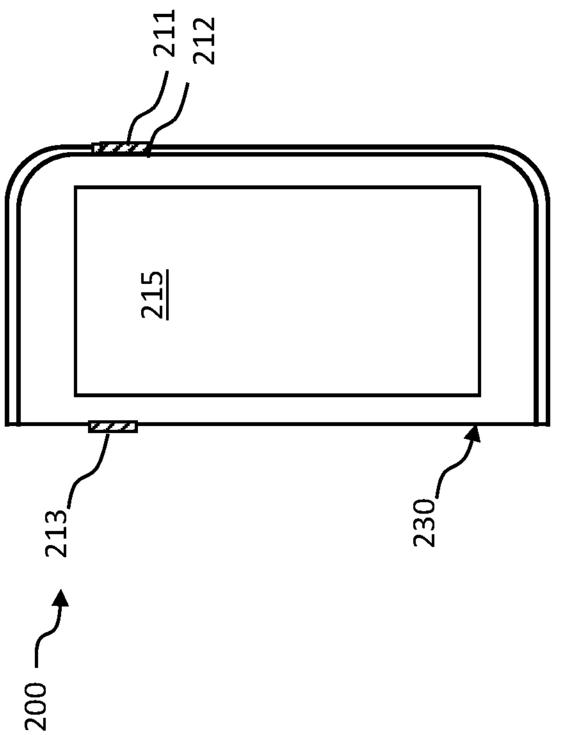
FIG. 2B is a plan view of the FIG. 2A second apparatus in a second configuration.
Figure 2A:
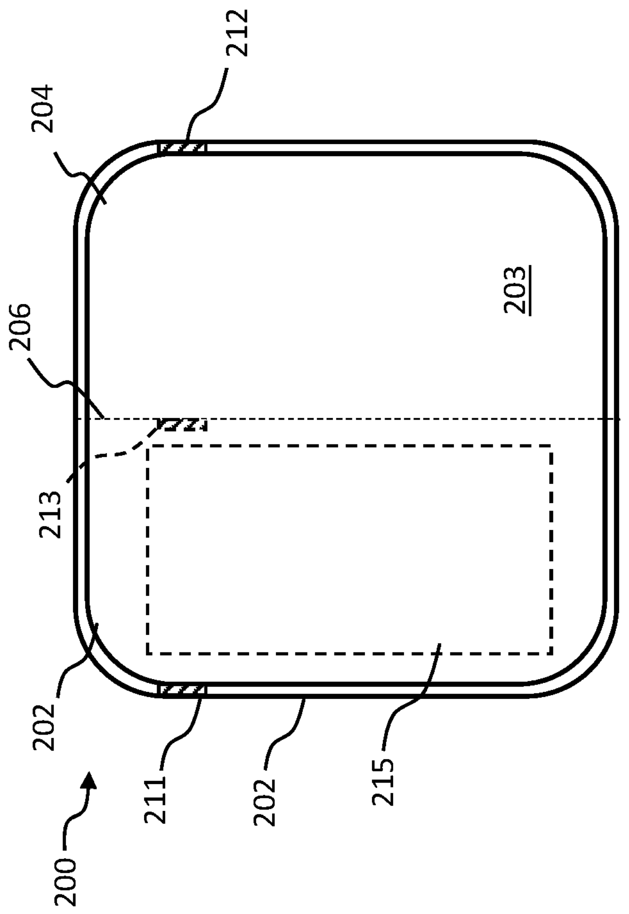
FIG. 2A is a plan view of a second apparatus in a first configuration to which one or more example embodiments may be applied.

Referring to FIG. 2A, an example user device is shown in the form of a foldable smartphone ("smartphone") 200.

The smartphone 200 may comprise an outer peripheral casing 202 and, on a front side, a touch-sensitive display (hereafter "display") 203. The smartphone 200 may comprise front and/or rear-facing cameras (not shown) as well as one or more microphones (not shown). The smartphone 200 comprises a body formed of first and second sections 202, 204 which may be hingedly connected at their respective inner edges, indicated by a fold axis 206. The first and second sections 202, 204 may rotate about the fold axis 206, one with respect to the other, so as to reconfigure the smartphone 200 from an open configuration, as shown, to a closed configuration, as shown in FIG. 2B. As mentioned above, there may be one or more intermediate configurations (not shown) between the shown open and closed configurations. In some examples, the first and second sections 202, 204 need not be 180 degrees apart in order for the smartphone 200 to be in an open configuration. For example, the first and second sections 202, 204 may be at least too degrees apart when in the open configuration. The display 203 is carried by the first and second sections 202, 204 and is flexible, at least in the region of the fold axis 206, so that it folds and unfolds as the smartphone 200 is reconfigured. The display 203 has a larger area than, say, non-foldable smartphones and an operating (OS) system and/or one or more application user interfaces (UI) may make use of such a larger display area for displaying enlarged versions of their conventional UIs and/or showing multiple UIs simultaneously. For example, a movie application may show a movie in a larger format.

Returning to FIG. 2A, the smartphone 200 may also comprise at least three loudspeakers, in this case first to third loudspeakers 211-213. First and second loudspeakers 211, 212 are shown located on the left and right-hand sides of the smartphone 200 respectively. The first and second loudspeakers 211, 212 are spaced apart in a first direction along a horizontal plane and are generally aligned along the vertical plane, although this is not strictly necessary (one may be higher than the other). A third loudspeaker 213 is shown located on the rear side of the smartphone, to one side of the fold axis 206, although this is not essential and other locations for the third loudspeaker may be used. For example, the third loudspeaker 213 may be located on a front side of the smartphone 200, closer to the top or bottom side thereof or on one of the top or bottom edges.

For the avoidance of doubt, the respective locations of the first and second loudspeakers 211, 212 need not be at the extreme edges of the tablet computer and they may be located inwardly of said edges. The first and second loudspeakers 211, 212 may be mounted on the front side of the smartphone 200, generally perpendicular to the display 203, or they may be mounted at other positions such as on the edges of the outer peripheral casing 202, generally parallel with the display. Alternatively still, the first and second loudspeakers 211, 212 may be mounted on a rear side of the smartphone, generally perpendicular to the display 203.

The smartphone 200 may also comprise a second display 215, which may or may not be touch-sensitive, on its rear side. The second display 215 may or may not be active during use of the smartphone 200 in the open configuration shown in FIG. 2A.

FIG. 2B shows the smartphone 200 when reconfigured to the second, closed configuration. The second display 215 may now face the user and may automatically become active, for example showing a conventional OS UI and/or application UIs.

In the closed configuration, the first loudspeaker 211 is associated with the same side as the second loudspeaker 212, that is, in this case, the right-hand side. The first loudspeaker 211 is adjacent to the second loudspeaker. The third loudspeaker 213 is now associated with the left-hand side of the smartphone 200. As is shown, the third loudspeaker 213 may be substantially aligned with the first and second loudspeakers 211, 212 along the horizontal plane, although this is not essential.

It is to be noted that at least a fourth loudspeaker (not shown) may also be provided on the smartphone 200. For example, it may be located towards on the rear-side of the smartphone, nearer the bottom of the fold axis 206 and aligned with the third loudspeaker 213 along the vertical plane. Reference numeral 230 indicates a possible location.

Similar to the tablet 100 shown in FIGS. 1A and 1B, the smartphone 200 may be rotated between first and second orientations.

Figure 3:
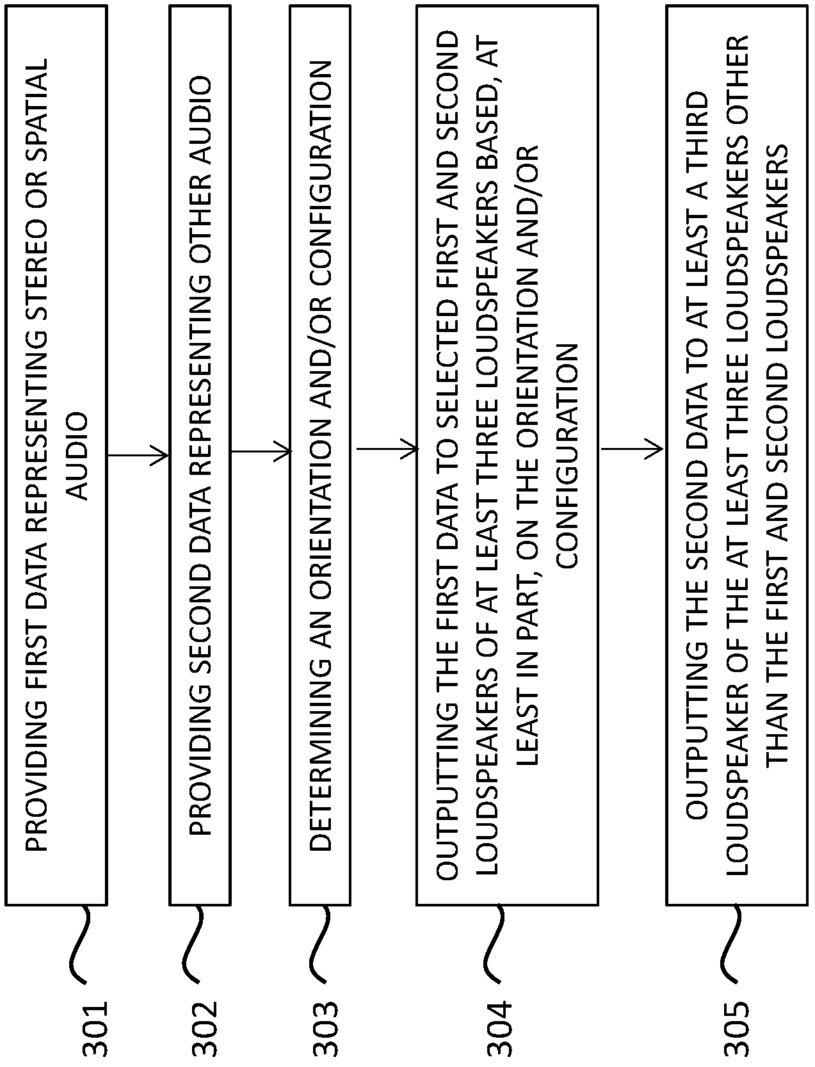
FIG. 3 is a flow diagram illustrating processing operations that may be performed by an apparatus according to one or more example embodiments.

FIG. 3 is a flow diagram indicating processing operations that may be performed by an apparatus, for example the tablet 100 or the smartphone 200, or rather one or more controllers or one or more processing means thereof, according to one or more example embodiments. The processing operations may be performed by any apparatus comprising at least three loudspeakers. The processing operations may be performed by means of hardware, software, firmware or a combination thereof.

A first operation 301 may comprise providing first data representing stereo or spatial audio.

A second operation 302 may comprise providing second data representing other audio. Examples of what the second data may represent are given below.

The term "providing" may mean receiving, decoding or generating.

A third operation 303 may comprise determining an orientation and/or configuration of the apparatus.

For example, the orientation may be determined as a first orientation or a second orientation. The second orientation may be perpendicular to the first orientation, or some predetermined angle in-between. The first orientation may be a landscape orientation and the second orientation may be a portrait orientation, or vice versa. The second orientation may result from the apparatus being rotated from the first orientation by substantially forty five degrees or more; however, it may be that a rotation of substantially ninety degrees is required. For example, the configuration of the apparatus may be determined as an open or closed configuration of a foldable apparatus, such as the foldable smartphone 200 described above with reference to FIGS. 2A and 2B.

A fourth operation 304 may comprise controlling audio output by outputting the first data to selected first and second loudspeakers of the at least three loudspeakers based, at least in part, on the orientation and/or configuration of the apparatus.

A fifth operation 305 may comprise controlling audio output by outputting the second data to at least a third loudspeaker of the at least three loudspeakers, other than the first and second loudspeakers.

It follows that, based on the orientation and/or configuration of the apparatus, certain selected first and second loudspeakers may be dedicated to stereo or spatial audio output and a third loudspeaker, different from the selected first and second loudspeakers, may be dedicated to the other audio output. In this way, more, i.e. at least three, of the available loudspeakers are utilised whilst also allowing greater freedom for applying certain effects, e.g. stereo widening and/or increased volume, to the stereo or spatial audio which is effectively distinct from other audio data, at least for a certain period of time. No mixing may take place between the first and second data.

In the first operation 301, the first data may be audio data representing any form of stereo or spatial audio, for example basic stereo comprising first and second channels (2.0), or 2.1, 5.1 or 7.1, ambisonics, metadata assisted spatial audio (MASA), object-based MASA (O-MASA) or MPEG spatial audio object coding (SAOC), to give but some examples.

In the second operation 302, the second data may be audio data representing other data. The second data may be any audio data that is not the currently-output first data.

For example, the second data may represent monaural audio not associated with the first data, such as system sounds that may be generated by the OS or one or more applications executed on the apparatus. These may include notifications issued by the OS or applications in response to one or more events, such as notification of a text or multimedia message arriving, alarm alerts, incoming call or conference alerts, new email alerts, social media alerts and so on. Additionally, or alternatively, these may include audio from a call, conference or voice message, i.e. speech audio. Additionally, or alternatively, where the first data represents stereo comprising at least left and right channels, the second data may be associated with a same audio scene as the first data but is not associated with the left or right channels. For example, the second data may represent monaural audio associated with one or more objects of the audio scene, such as may be the case if the audio data is in the O-MASA or SAOC formats. In such cases, the first data may represent stereo or spatial ambient sounds and the second data may represent one or more monaural objects. Additionally, or alternatively, the second data may represent monaural low-frequency (bass) components associated with the first data.

In some cases, the second data may also represent stereo sounds, but is different from the first data based on, for example, the second data having a lower priority than the first data. This may be the case if the first data is provided, decoded and/or output first, and the second data is provided and/or decoded after the first data.

The second and third operations 304, 305 may be triggered responsive to one or more events.

For example, the second and third operations 304, 305 may be triggered responsive to some part of the apparatus, whether or not one or more processors or controllers of the apparatus, detecting that the first data represents one or more particular types of content, e.g. stereo or spatial audio. This may be based on metadata received, or associated with, the first data. Once stereo or spatial audio is detected, that audio data may be assigned to the first and second loudspeakers and the other audio data may be assigned to the at least third loudspeaker.

Additionally, or alternatively, the second and third operations 304, 305 may be responsive to some part of the apparatus, whether or not one or more processors or controllers of the apparatus, detecting that the first data is received from one or more predetermined applications on the apparatus. For example, it may be assumed that certain music or movie—playing applications are providing stereo or spatial audio.

Additionally, or alternatively, the second and third operations 304, 305 may be responsive to some part of the apparatus, whether or not one or more processors or controllers of the apparatus, detecting an above-threshold volume input associated with the first data. For example, if the user selects to boost the volume of stereo or spatial sounds being played through a default pair of loudspeakers (at least one of which is also used for other sounds, such as notifications) then selection of the dedicated first and second speakers for boosted stereo may take place, together with moving other sounds to the at least third loudspeaker. This may avoid unwanted artefacts such as clipping.

Additionally, or alternatively, the second and third operations 304, 305 may be responsive to detecting a user input.

This may also be the case if certain audio processing effects are selected for the first data, e.g. stereo widening effects or other audio effects.

Particular example embodiments will now be described with reference to the tablet 100 and smartphone 200 user devices, described above with reference to FIGS. 1 and 2.

Referring to FIG. 1A, upon receipt of first data representing stereo or spatial sounds, a controller or processing means of the tablet 100 which is configured to operate according to the operations described for FIG. 3, may determine that the tablet is in a first orientation and selects the first and second loudspeakers 111, 112 for output of the first data. The left and right channel parts of the first data may be respectively output by the first and second loudspeakers 111, 112. Second data, such as data that notifies the user of a new text message or incoming call, is output by one or both of the third and fourth loudspeakers 113, 114 and not by either of the first and second loudspeakers 111, 112.

Referring to FIG. 2A, upon detecting a different orientation of the tablet 100, in this case due to rotation of the tablet by ninety degrees, the controller or processing means of the tablet may select the fourth and third loudspeakers 114, 113 for output of the first data. The left and right channels parts of the first data may be respectively output by the fourth and third loudspeakers 114, 113 while the second data may be output by one or both of the first and second loudspeakers 111, 112 and not by either of the fourth and third loudspeakers.

Figure 4:
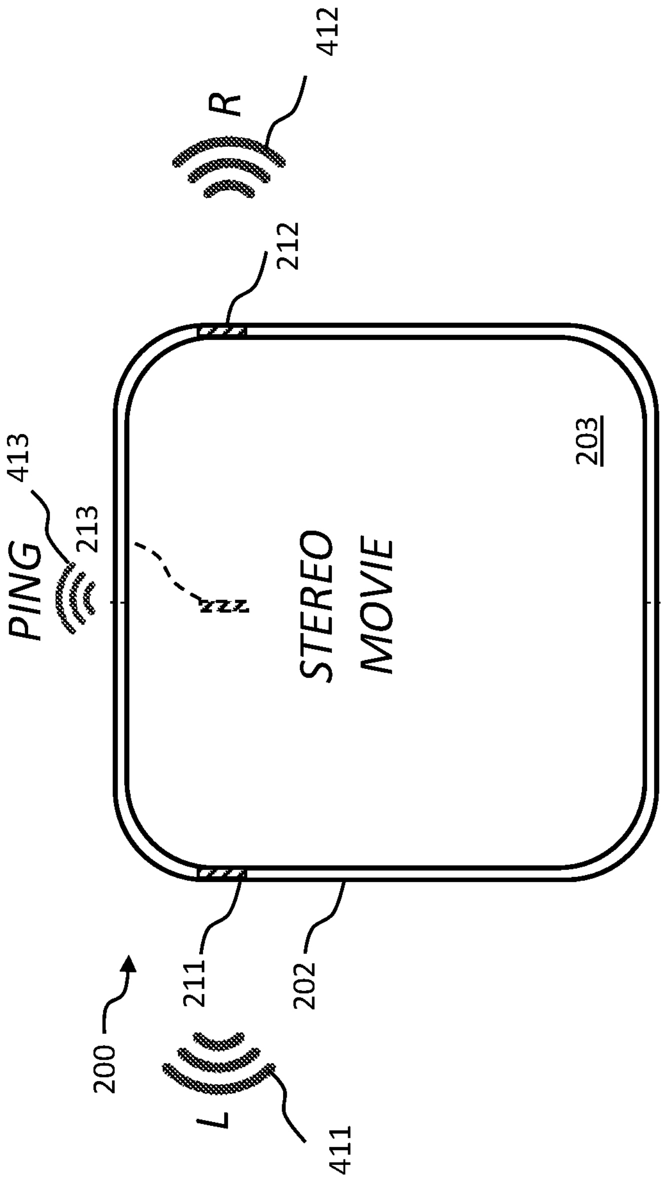
FIG. 4 shows the FIG. 2A second apparatus when used according to a first example embodiment.

Referring now to FIG. 4, which shows the FIG. 2 smartphone 200, upon receipt of first data representing stereo or spatial sounds, a controller or processing means of the smartphone may determine that the smartphone is in the open configuration (and possibly also the current orientation as above) and selects the first and second loudspeakers 211, 212 for output of the first data. The left and right channel parts 411, 412 of the first data may be respectively output by the first and second loudspeakers 211, 212. Second data, such as data that notifies the user of a new text message or incoming call with a "ping" 413 may be output by the third loudspeaker 213 (seen in FIG. 2A) from the rear side thereof and not by either of the first and second loudspeakers 211, 212 Any of the above other types of second data may also be output in this way.

In some examples, there may be one or more additional loudspeakers for output of the second data. In some examples, upon rotation of the smartphone 200, re-allocation of the loudspeakers for the left and right channel parts 411, 412 may take place as for the FIG. 1 tablet 100.

Figure 5A:
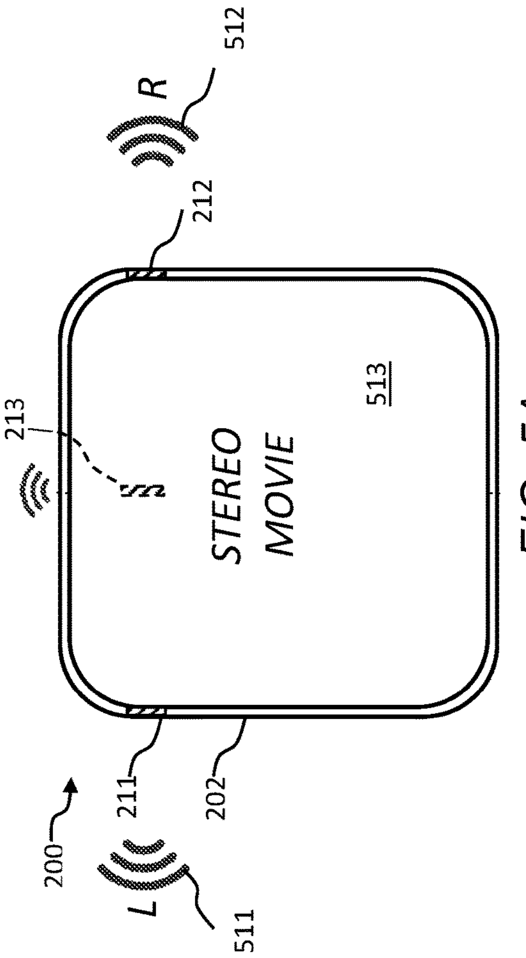
FIG. 5A shows the FIG. 2A second apparatus when used according to a further example embodiment.

FIG. 5A shows the FIG. 2 smartphone 200 in the open configuration when playing a movie that provides first data representing stereo sounds. The first data may represent left and right channel parts 511, 512 being output by the first and second loudspeakers 211, 212. The movie is played via a movie UI 513 in an enlarged or full-screen mode. Second data may be output by the third loudspeaker 213 from the rear side thereof and not by either of the first and second loudspeakers 211, 212.

Figure 5C:
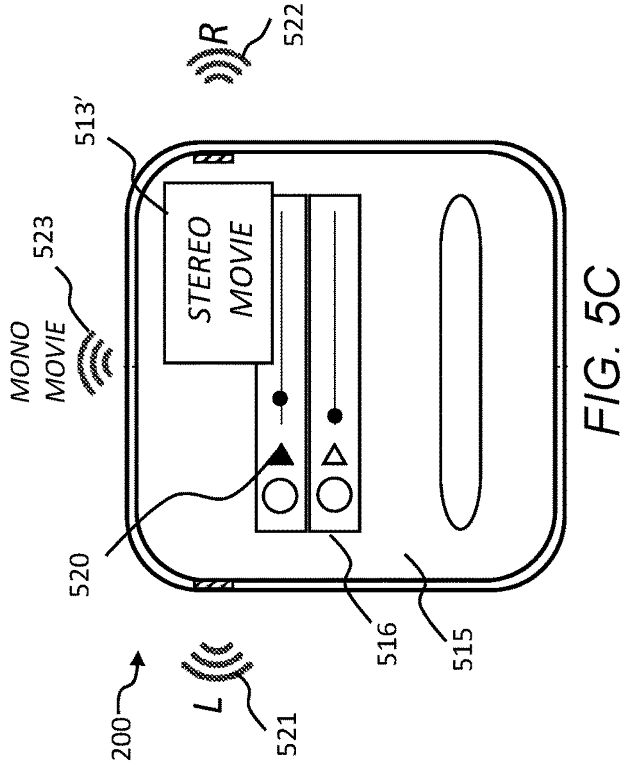
FIG. 5C shows the FIG. 5A second apparatus with an indication of another type of audio output when using the picture-in-picture display mode.
Figure 5B:
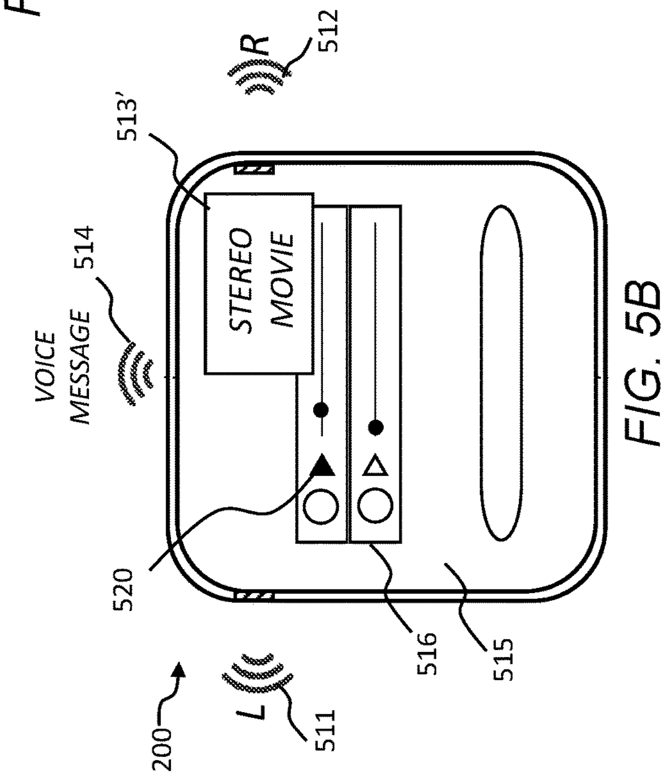
FIG. 5B shows the FIG. 5A second apparatus with an indication of one type of audio output when using picture-in-picture display mode.

As shown in FIG. 5B, the movie UI 513 can transition (due to user selection and/or a change in orientation) to a picture-in-picture (PiP) display mode in which a smaller version 513' of the movie UI overlays one or more other UIs. In this case, there are first and second UIs 515, 516 which may be respectively associated with an OS and a message application.

Full-screen and PiP display modes are another example of a user device configuration.

The controller or processing means of the smartphone 200 may continue using the first and second loudspeakers 211, 212 for output of the left and right channel parts 511, 512 while the movie is playing in the PiP display mode. The second data, which may represent voice messages 514 of the message application, may be output by the third loudspeaker 213 and not by either of the first and second loudspeakers 211, 212.

For example, upon selection of a particular "play" icon 520 on the second UI 516, the associated voice message may be played in monaural format using the third loudspeaker 213.

As shown in FIG. 5C, as an alternative, the controller or processing means of the smartphone 200 may switch output of the audio from one or both of the OS and message application to the first and second loudspeakers 211, 212 and output the first data from the movie application to the third loudspeaker 213, which may involve playback in monaural format 523. If the audio from the message application is in stereo format, the voice messages may be played using left and right channel parts 521, 522 output by the first and second loudspeakers 211, 212.

Different volume controllers may be used for whichever application is currently active.

The controller or processing means of the smartphone 200 may determine which of the FIGS. 5B and 5C scenarios to use based on one or more options.

For example, the FIG. 5B scenario may be the default unless audio data from the OS and/or message application, represents stereo or spatial audio and/or some predetermined type of content. In this case, the FIG. 5C scenario may be used.

Additionally, or alternatively, first preference data may be stored on the smartphone 200, indicating that the OS and/or message application has priority over the movie application when the first application transitions to the PiP display mode. In other words, regardless of the audio format of data from the OS and/or message application, the FIG. 5C scenario may be used in response to a transition to the PiP display mode. The first preference data may be user defined and/or user modifiable via a settings option of the OS.

Additionally, or alternatively, second preference data may be stored on the smartphone 200, indicating that the OS and/or message application has priority over the movie application based on a current orientation and/or configuration of the apparatus. For example, even in the PiP display mode, the movie application may be preferred for stereo output using the first and second loudspeakers 211, 212 (FIG. 5B scenario) unless, for example, the smartphone 200 is rotated by ninety degrees from a first orientation to a second orientation. The first orientation may be better for widescreen output of the movie, giving the movie application preference for stereo output. The second orientation may result in narrower output of the movie, giving the OS and/or message application preference for stereo output. The second preference data may also be user defined and/or user modifiable via a settings option of the OS.

In general, the first and/or second preference data may be used to indicate which applications use the first and second loudspeakers 211, 212 and which use the third loudspeaker 213 in different scenarios when transitioning to a PiP display mode. This may be based on the content type, e.g. movies always use the first and second loudspeakers 211, 212, but music applications and/or data formats use the third loudspeaker 213 if the UI transitions to the PiP mode and another application provides stereo data.

In another example embodiment, which may be combined with one or more other embodiments, the first and second data may represent respective parts of an audio scene.

Figure 6:
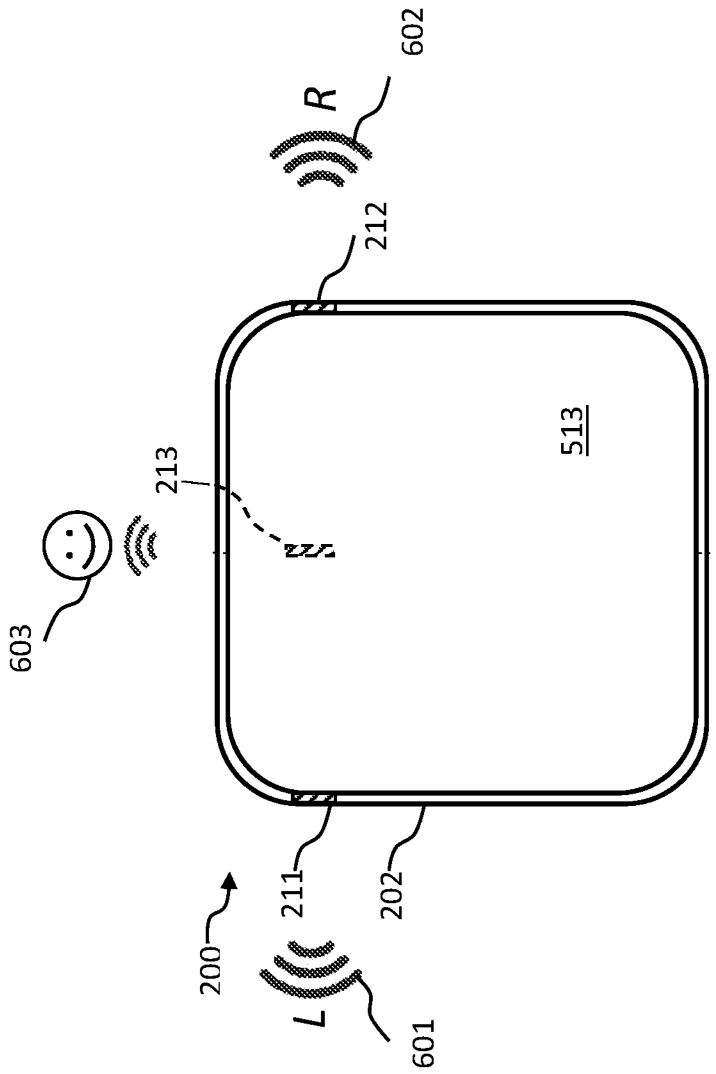
FIG. 6 shows the FIG. 2A second apparatus when used according to a further example embodiment.

For example, the first data may represent stereo or spatial audio associated with ambient sounds of the audio scene and the second data may represent, or may be output as, monaural audio associated with one or more objects of the audio scene. Referring to FIG. 6 in which the smartphone 200 is in the open configuration, the first data may represent one or more ambient stereo or spatial sounds, such as background sounds or noise of a captured or synthesised environment. More specifically, the first data may represent left and right channel parts 601, 602 which are output by the first and second loudspeakers 211, 212 to recreate the ambience or background sounds or noise. Provided second data, which may accompany the first data, or which may be provided separately from the first data, may represent one or more specific audio objects in the captured or synthesised environment, e.g. a voice of a person 603 within the environment. The second data may be output by the third loudspeaker 213 from the rear side thereof and not by either of the first and second loudspeakers 211, 212 to recreate the one or more audio objects. In this way, one or more key monaural objects may be output with greater clarity and may recreate a spatial effect usually only achievable with headphones.

The first and second data may be provided in any suitable data format, examples being the O-MASA or MPEG SAOC formats mentioned above. O-MASA, for example, is proposed as part of the Immersive Voice and Audio Services (IVAS) standard, currently being standardized by the 3rd Generation Partnership Project (3GPP).

In another example embodiment, which may be combined with one or more other embodiments, one or more effects, such as stereo-widening may be performed based on separate output of the first and second data. For example, returning to FIG. 4 which shows the FIG. 2 smartphone 200, upon receipt of first data representing stereo or spatial sounds, a controller or processing means of the smartphone may select the first and second loudspeakers 211, 212 for output of the first data. The left and right channel parts 411, 412 of the first data may be respectively output by the first and second loudspeakers 211, 212. The second data may represent low frequency (bass) sounds, e.g. those below 120 Hz, for output by the third loudspeaker 213. In this case, a stereo widening effect may manually or automatically be initiated for the first data. Stereo widening may be considered an action that increases the perceived width or space between the left and right channels. This may involve changing the phase of the audio signals, modifying the processing, using different delays and so on. This should preferably be performed independently of the low frequency sounds where, for example, phase changes are more noticeable. Hence, by outputting the low frequency sounds to the third loudspeaker 213, low frequency sounds are more cleanly perceived. Additionally, or alternatively, it is possible to apply low-frequency effects (LFEs) to the low frequency sounds and not affect sounds output by the first and second loudspeakers 211, 212. Applying such effects, whether stereo widening or LFEs, may be triggered by user input.

Still referring to FIG. 4, in another example embodiment which may be combined with one or more other embodiments, output of the second data to the third loudspeaker 213 may be responsive to detecting an above-threshold volume input for current stereo or spatial audio. For example, the threshold may be a default maximum volume level when stereo or spatial audio is output by the first and second loudspeakers 211, 212. At this time, second data representing other audio may be mixed with the first data and output by one or both of the first and second loudspeakers 211, 212. If a user wishes to boost the volume beyond the default maximum volume level, for example using a touch, voice and/or gesture input, this may trigger the second data to be output by the third loudspeaker 213 and not one or both the first and second loudspeakers 211, 212. Where the first data represents stereo audio, this may involve switching to another multi-channel format, e.g. 2.1, 5.1, 7.1, so that left and right channels can be increased in volume whilst low frequency audio is output by the third loudspeaker 213. Similarly, system sounds such as notifications and/or voice messages can be output by the third loudspeaker 213. The same or similar advantages to those mentioned above may be achieved, although in this case the triggering is volume-based and not necessarily content-based.

Such volume-based triggering may also be applicable to other embodiments disclosed herein.

Figure 7A:
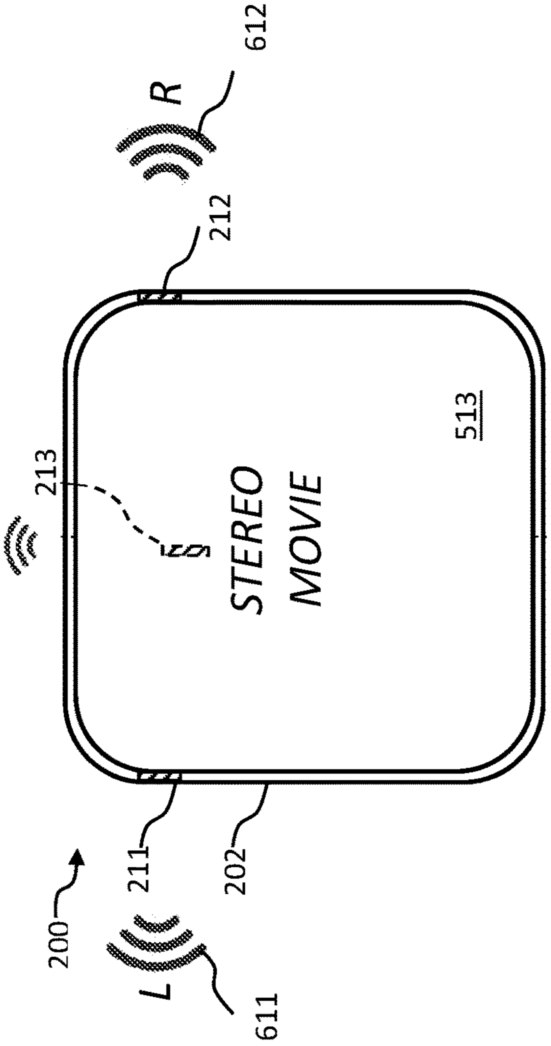
FIG. 7A shows the FIG. 2A second apparatus when used according to a further example embodiment.

FIG. 7A shows the FIG. 2 smartphone 200 in the open configuration when playing a movie having associated first data representing stereo sounds. The first data may represent left and right channel parts 611, 612 which may be output by the first and second loudspeakers 211, 212. Second data may be output by the third loudspeaker 213 from the rear side thereof and not by either of the first and second loudspeakers 211, 212.

Figure 7B:
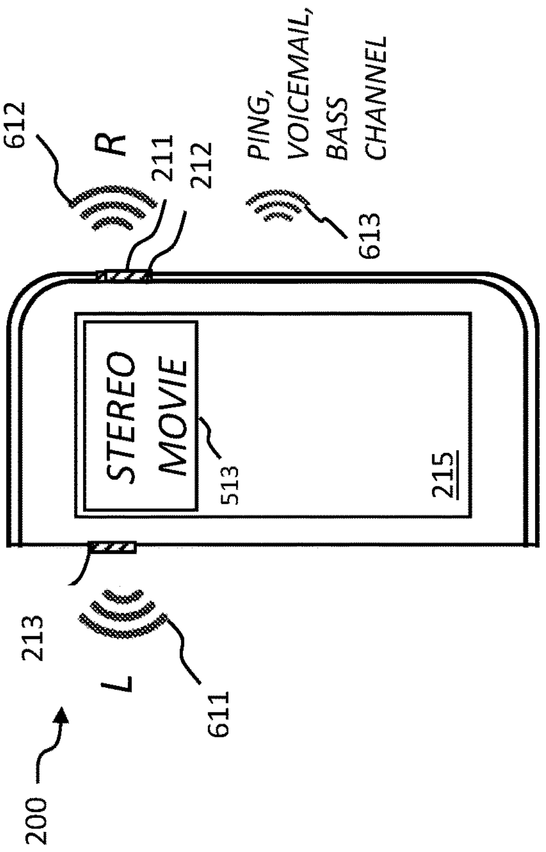
FIG. 7B shows the FIG. 7A second apparatus when used in the second configuration.

FIG. 7B shows the smartphone 200 in the closed configuration, which may cause the movie application UI 513 to be output on the second display 215. One or more other application UIs and/or notification icons may be shown below the movie UI 513 on the second display 215. In the closed configuration, the first loudspeaker 211 is now associated with the same side as the second loudspeaker 212, that is, in this case, the right-hand side. The first loudspeaker 211 is adjacent to the second loudspeaker. The third loudspeaker 213 is now associated with the left-hand side of the smartphone 200. In the closed configuration, the controller or processor of the smartphone may be configured to select the third loudspeaker 213 in place of the first loudspeaker 211 for left channel part 611. The second loudspeaker 212 is still used for the right channel part 612. The other audio data, which may represent one or more of notification "pings", voicemail messages, audio objects or low frequency audio (represented generally by reference numeral 613) may by output by the first loudspeaker 211. For example, the other audio data may represent low frequency sounds associated with the first data. As mentioned above, this may enable stereo widening and/or other LFEs to be applied cleanly to the low frequency sounds now output by the first loudspeaker 211.

Embodiments described with reference to the smartphone 200 may also be employed with other user devices, such as the tablet 100 shown in FIG. 1.

In general, the other audio data may represent notifications issued by the OS or applications in response to one or more events, such as notification of a text or multimedia message arriving, alarm alerts, incoming call or conference alerts, new email alerts, social media alerts and so on. Additionally, or alternatively, the second data may represent monaural audio associated with one or more objects of an audio scene, such as may be the case if the audio data is O-MASA or SAOC. Additionally, or alternatively, the second data may represent monaural low-frequency (bass) components associated with a movie.

As will be appreciated, example embodiments involve allocating stereo or spatial sounds to dedicated first and second speakers and other sounds to at least a third speaker. This avoids disadvantages associated with mixing other sounds with the stereo, including better perception of stereo or spatial, less interruption, as well as making it more convenient to boost and/or add effects to the stereo or spatial sounds, including low frequency channels, LFEs and/or audio objects associated with a spatial sound field. More of the available speakers can be utilized.

EXAMPLE APPARATUS

Figure 8:
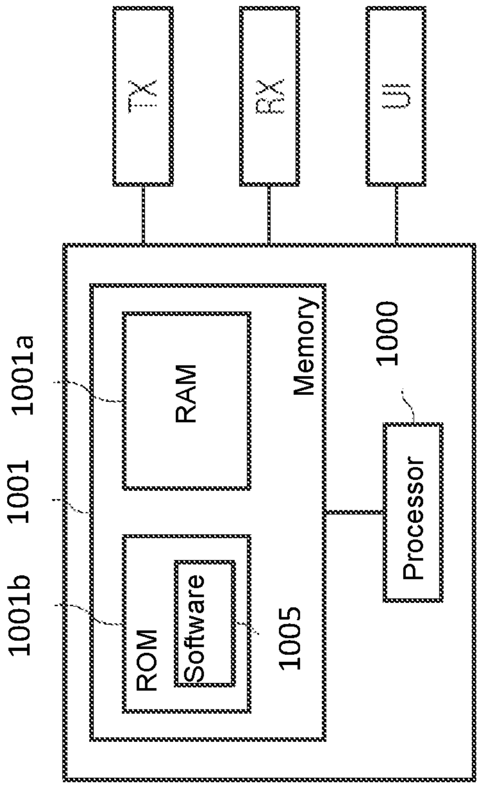
FIG. 8 shows an apparatus according to one or more example embodiments.

FIG. 8 shows an apparatus according to some example embodiments. The apparatus may be configured to perform the operations described herein, for example operations described with reference to any disclosed process. The apparatus comprises at least one processor moo and at least one memory 1001 directly or closely connected to the processor. The memory 1001 includes at least one random access memory (RAM) loom and at least one read-only memory (ROM) 1001*b*. Computer program code (software) 1005 is stored in the ROM 1001*b*. The apparatus may be connected to a transmitter (TX) and a receiver (RX). The apparatus may, optionally, be connected with a user interface (UI) for instructing the apparatus and/or for outputting data. The at least one processor 1000, with the at least one memory 1001 and the computer program code 1005 are arranged to cause the apparatus to at least perform at least the method according to any preceding process, for example as disclosed in relation to the flow diagram of FIG. 3 and related features thereof.

Figure 9:
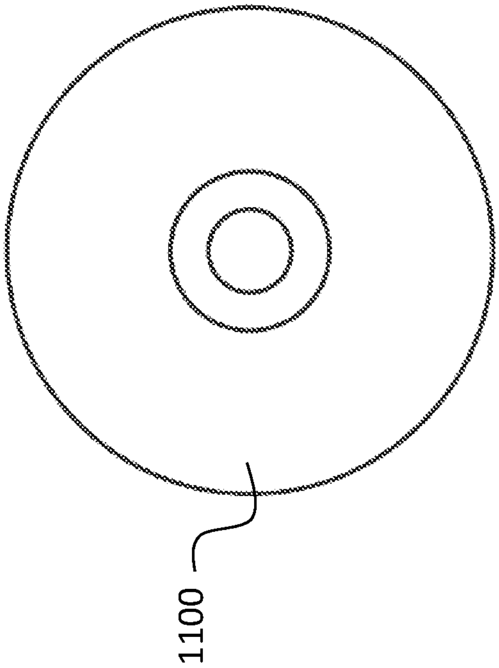
FIG. 9 shows a non-transitory medium for storing computer-readable code or instructions which, when executed by an apparatus such as that of FIG. 8, may perform processing operations described herein.

FIG. 9 shows a non-transitory media 1100 according to some embodiments. The non-transitory media 1100 is a computer readable storage medium. It may be e.g. a CD, a DVD, a USB stick, a blue ray disk, etc. The non-transitory media 1100 stores computer program instructions, causing an apparatus to perform the method of any preceding process for example as disclosed in relation to the flow diagram of FIG. 3 and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus, comprising:

at least three loudspeakers spaced apart at respective locations on the apparatus;

at least one processor; and at least one memory storing instructions that, when executed by the at least one processor, cause the apparatus at least to:

provide first data representing stereo or spatial audio;

provide second data representing other audio;

determine at least one of an orientation or configuration of the apparatus;

control audio output, by:

outputting the first data to selected first and second loudspeakers of the at least three loudspeakers based, at least in part, on at least one of the orientation or the configuration of the apparatus; and outputting the second data to at least a third loudspeaker of the at least three loudspeakers other than the first and second loudspeakers, wherein the second data represents one or more of:

system sounds generated by an operating system or an application executed by the apparatus; and audio from a call, conference or voice message.

2. The apparatus of claim 1, wherein the outputting is responsive, at least in part, to the first data representing stereo or spatial audio.

3. The apparatus of claim 1, wherein the outputting is responsive, at least in part, to the first data being received from one or more predetermined applications executed by the apparatus.

4. The apparatus of claim 1, wherein the outputting is responsive, at least in part, to an above-threshold volume input or effects input associated with the first data.

5. The apparatus of claim 1, wherein, based on at least one of the orientation or the configuration of the apparatus, the selected first and second loudspeakers are respectively associated with left and right-hand sides of the apparatus, and wherein, optionally, the third loudspeaker is at a location in-between the selected first and second loudspeakers.

6. The apparatus of claim 1, wherein the apparatus comprises a foldable body movable between open and closed orientations, wherein:

in the open orientation, the selected first and second loudspeakers are respectively associated with left and right-hand sides of the apparatus and the third loudspeaker is at a location in-between the first and second loudspeakers; and in the closed orientation, the first and second loudspeakers are associated with the same side of the apparatus, the control means being configured to select the third loudspeaker in place of the first loudspeaker so that the first data is output by the second and third loudspeakers and the second data is output by the first loudspeaker.

7. The apparatus of claim 1, wherein the second data represents monaural audio.

8. The apparatus of claim 7, wherein the first and second data represent respective parts of an audio scene, the first data representing stereo or spatial audio associated with one or more ambient sounds of the audio scene and the second data representing monaural audio associated with one or more objects of the audio scene.

9. The apparatus of claim 8, wherein the first and second data are encoded in a data file or stream using the metadata-assisted spatial audio, MASA, format.

10. The apparatus of claim 1, wherein the second data represents low-frequency audio components associated with the first data.

11. The apparatus of claim 1, wherein the second data represents one or more of:

system sounds generated by an operating system or an application of the apparatus; or audio from a call, conference or voice message.

12. The apparatus of claim 11, wherein the system sounds correspond to notifications issued by the operating system or application executed by the apparatus in response to one or more events.

13. The apparatus of claim 1, wherein the first data is associated with a first application having a first user interface which can transition from an enlarged display mode to a picture-in-picture display mode in which the first user interface overlays at least a second user interface associated with a second application, wherein:

responsive to the first user interface transitioning from the enlarged display mode to the picture-in-picture display mode, the control means is further configured to switch audio data from the second application to the first and second loudspeakers for stereo output, and the first data from the first application to the third loudspeaker.

14. The apparatus of claim 13, wherein the apparatus is further caused to switch the audio data responsive to one or more of:

audio data from the second application representing stereo or spatial audio;

first preference data indicating that the second application has priority over the first application when the first application is in the picture-in-picture display mode; or second preference data indicating that the second application has priority over the first application based on a current orientation and/or configuration of the apparatus.

15. A method, comprising:

providing first data representing stereo or spatial audio;

providing second data representing other audio;

determining at least one of an orientation or configuration of an apparatus comprising at least three loudspeakers;

outputting the first data to selected first and second loudspeakers of the at least three loudspeakers apparatus based, at least in part, on at least one of the orientation or the configuration of the apparatus; and outputting the second data to at least a third loudspeaker of the at least three loudspeakers other than the first and second loudspeakers, wherein the second data represents one or more of:

system sounds generated by an operating system or an application executed by the apparatus; and audio from a call, conference or voice message.

16. The method of claim 15, wherein the outputting is responsive, at least in part, to the first data representing stereo or spatial audio.

17. The method of claim 15, wherein the outputting is responsive, at least in part, to the first data being received from one or more predetermined applications executed by the apparatus.

18. The method of claim 15, wherein the outputting is responsive, at least in part, to an above-threshold volume input or effects input associated with the first data.

19. The method of claim 15, wherein, based on at least one of the orientation or the configuration of the apparatus, the selected first and second loudspeakers are respectively associated with left and right-hand sides of the apparatus, and wherein, optionally, the third loudspeaker is at a location in-between the selected first and second loudspeakers.

20. The method of claim 15, wherein the second data represents monaural audio.

* * * * *